United States Patent
Jurisch

(10) Patent No.: US 7,327,815 B1
(45) Date of Patent: Feb. 5, 2008

(54) METHOD FOR SYNCHRONIZING SEVERAL DIGITAL INPUT SIGNALS

(75) Inventor: Andreas Jurisch, Schwante (DE)

(73) Assignee: Siemens Aktiengesellschaft AG, Munich (DE)

( * ) Notice: Subject to any disclaimer, the term of this patent is extended or adjusted under 35 U.S.C. 154(b) by 0 days.

(21) Appl. No.: 09/868,773

(22) PCT Filed: Nov. 30, 1999

(86) PCT No.: PCT/DE99/03881

§ 371 (c)(1),
(2), (4) Date: Jun. 21, 2001

(87) PCT Pub. No.: WO00/39703

PCT Pub. Date: Jul. 6, 2000

(30) Foreign Application Priority Data

Dec. 23, 1998 (DE) ................. 198 60 720

(51) Int. Cl.
*H04L 7/00* (2006.01)
(52) U.S. Cl. .................. 375/354; 375/350; 375/230; 375/340; 375/240; 341/61; 341/76; 370/465; 370/536; 370/222
(58) Field of Classification Search ........... 375/354, 375/222, 232, 147, 355, 308, 350, 340, 295, 375/230, 240; 370/465, 536, 222; 341/61, 341/76

See application file for complete search history.

(56) References Cited

U.S. PATENT DOCUMENTS 4,700,226 A * 10/1987 Acampora ............ 375/240.05
4,707,841 A * 11/1987 Yen et al. .................... 375/230
4,760,487 A * 7/1988 Kwong et al. ................ 361/64
5,075,880 A * 12/1991 Moses et al. ................ 708/313
5,592,517 A * 1/1997 Camp et al. ................ 375/350
5,825,829 A * 10/1998 Borazjani et al. ........... 375/308
6,137,349 A * 10/2000 Menkhoff et al. .......... 327/552
6,594,613 B1 * 7/2003 Ley et al. .................... 702/140

FOREIGN PATENT DOCUMENTS

EP          0 198 684 B1    10/1986
EP          0 605 895 A1     7/1994
WO         WO 92/17951     10/1992

OTHER PUBLICATIONS

PCT/IB/338.
PCT/IPEA/409.

* cited by examiner

Primary Examiner—Chieh M. Fan
Assistant Examiner—Eva Zheng
(74) Attorney, Agent, or Firm—Laurence A. Greenberg; Werner H. Stemer; Ralph E. Locher

(57) ABSTRACT

The invention relates to a method for synchronizing a plurality of digital input signals which are formed by sampling with the aid of a dedicated operating clock in each case.

In order to be able to carry out such a method reliably with a relatively low outlay, according to the invention digital auxiliary signals (xd(nk+j), yd(nk+j)) are formed by sampling the digital input signals (x(k)) with the aid of a common postprocessing clock, use being made of a postprocessing clock which is at least twice as fast as the fastest operating clock; synchronized digital output signals (x(m), y(m)) which correspond to the digital input signals (x(k)) are formed by means of interpolating each digital auxiliary signal (xd(nk+j), yd(nk+j)).

3 Claims, 3 Drawing Sheets

METHOD FOR SYNCHRONIZING SEVERAL DIGITAL INPUT SIGNALS

CLAIM FOR PRIORITY

This application claims priority to International Application No. PCT/DE99/03881 which was published in the German language on Nov. 30, 1999.

TECHNICAL FIELD OF THE INVENTION

The invention relates to a method for synchronizing a plurality of digital input signals which are formed by sampling with the aid of a dedicated operating clock in each case.

BACKGROUND OF THE INVENTION

According to EP 0 198 684 B1, a differential relay operates to protect an electric power transmission line which is monitored at various points with regard to the current flowing through. The currents at the various points on the power transmission line are converted into digital input signals by using a dedicated operating clock in each case to sample the power supply line to be monitored at the various points. The sampling is undertaken in this case at the various points not with the aid of a synchronous clock, but with the aid of weakly differing clock frequencies. Running between the various points of the power supply line is a digital transmission channel via which a calling message is transmitted by a detecting device (master) at one point of the power supply line to another point, the calling message also including data which give information on the sampling instant at the one point. In response to the calling message, a detecting device (slave) at the other point of the power supply line emits a return signal which includes, inter alia, the information on the sampling instant in the master and on a time difference between the last sampling instant in the slave and the subsequent receiving instant of the calling message in the slave. The return signal received by the master is used in the master to draw a conclusion on the temporal skew of the sampling instants at the two different points on the power supply line, and the time skew is compensated with regard to the various sampling instants after a vector transformation of the received data by means of an appropriate pointer rotation.

SUMMARY OF THE INVENTION

In an embodiment of the invention, a plurality of digital input signals, formed by sampling with dedicated operating clock in each case forms digital auxiliary signals by sampling the digital input signals with a common postprocessing clock, which is at least twice as fast as the fastest operating clock. The digital input signals form synchronized digital output signals which correspond to the digital input signals by interpolating each digital auxiliary signal.

In one aspect of the invention, sampling the common postprocessing clock, filtering the digital input signals with a filter which is an inverse of a characteristic of an interpolation filter used for interpolating.

In another aspect of the invention, filtering an antialiasing filter directly after the interpolation occurs.

In a further aspect of the invention, the digital input signals are obtained from secondary variables, sampled with a dedicated operating clock, of measuring transducers in an electric power supply system.

In yet a further aspect of the invention, digital input signals are formed from secondary variables of Rogovsky measuring transducers, the digital auxiliary signals are formed directly from the input signals, and an integrator is used for the interpolation.

DETAILED DESCRIPTION OF THE PREFERRED EMBODIMENT

Figure 1:
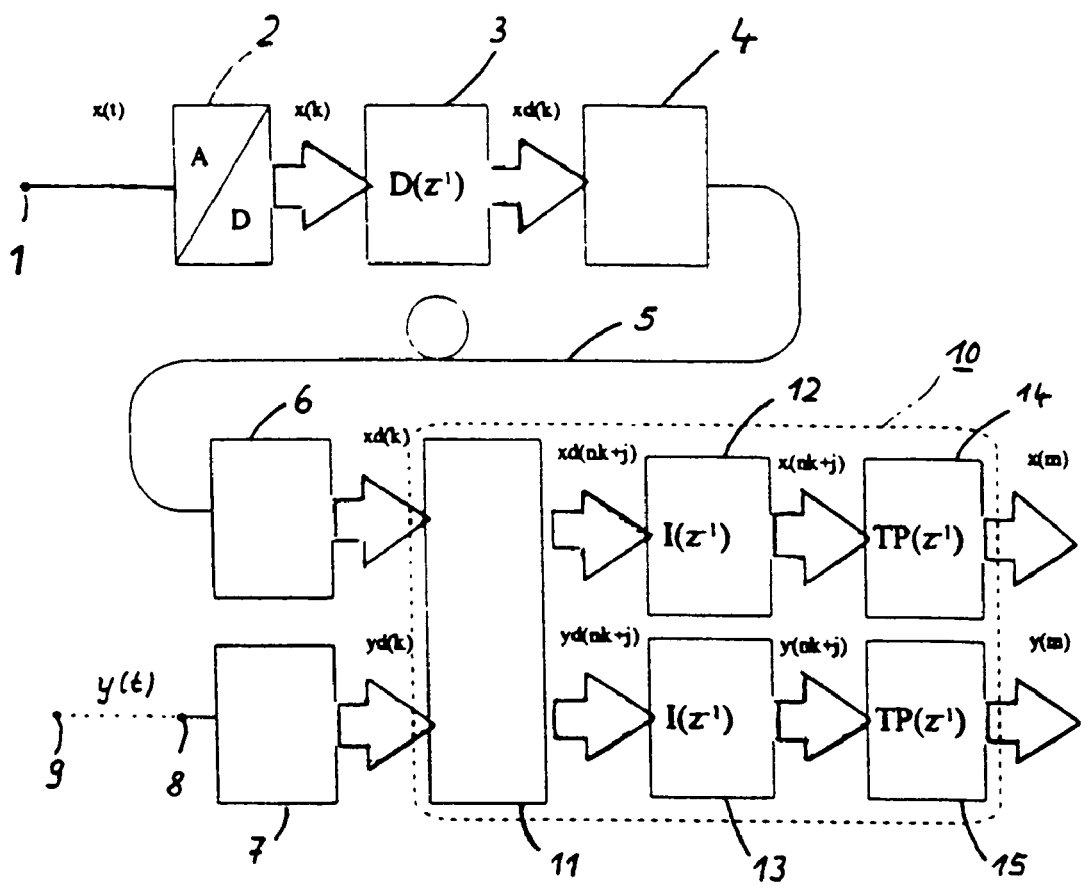
FIG. 1 illustrates an exemplary embodiment of an arrangement for carrying out the method according to the invention.

The invention is a method for synchronizing a plurality of digital input signals such that it can be carried out relatively easily and reliably without the need to form pointer variables.

According to the invention, digital auxiliary signals are formed by sampling the digital input signals with the aid of a common post-processing clock. Use is made of a post-processing clock which is at least twice as fast as the slowest operating clock. Synchronized digital output signals which correspond to the digital input signals are formed by means of interpolating each digital auxiliary signal.

An advantage of the method according to the invention is that it can be used to synchronize a plurality of digital input signals even when these input signals are formed from analog input signals by sampling with the aid in each case of a very different operating clock. Consequently, the clock generators required for generating the operating clocks need to fulfil only relatively low requirements for the purpose of carrying out the method according to the invention. Moreover, the method according to the invention places relatively modest requirements on the quality of the transmission channels. A further advantage is that the method according to the invention can be carried out relatively easily, because the sampling of digital input signals with the aid of a common post-processing clock, and the interpolation of the digital auxiliary variables thus formed are well-established measures.

The method according to the invention can be carried out with sufficient accuracy when the digital input variables are sinusoidal and/or cosinusoidal signals. When sinusoidal and/or cosinusoidal signals are not used, errors may occur. If the error is not acceptable with regard to the given requirements, it may be advantageous to, before being sampled with the aid of the common post-processing clock, filter the digital input signals with the aid of a filter having a characteristic which is the inverse of the characteristic of an interpolation filter used for the interpolation. In this embodiment, a transmission characteristic with the value 1 results on the transmission link of the digital input variables up to the formation of the digital output variables, resulting in the possibility of forming digital output variables which correspond very perfectly to the digital input variables.

It is advantageous to apply filtering with the aid of an anti-aliasing filter is undertaken directly after the interpolation, in order to achieve a bandwidth limitation for an evaluation device to which the digital output signals are to be applied.

The digital input signals to be synchronized can be of different formation. For example, they can be output signals of sensors which respectively use individual clock generators to output digital signals at their output from analog input variables. Furthermore, the digital input signals can be generated from analog measured variables of an electric power supply system by sampling at various points on the power supply system. The method according to the invention is also advantageous when the digital input variables are obtained from secondary variables, sampled with the aid in each case of a dedicated operating clock, of measuring transducers in an electric power supply system. In this case, the measuring transducers can be arranged at various positions, for example in a transformer substation, or can be obtained as a component of a differential protective arrangement at the ends of an electric power supply line or at other terminals of a generator or power transformer.

If the measuring transducers are Rogovsky measuring transducers, the digital input signals formed from the secondary variables of such measuring transducers are converted directly into the digital auxiliary variables, and an integrator is used for the interpolation.

As illustrated in FIG. 1, an analog input signal x(t) at input, is converted in an analog-to-digital converter 2 into a digital input signal x(k). This digital input signal x(k) traverses a signal encoder 3 formed by a differentiator, resulting at the output of the signal encoder 3 in a pulse train xd(k) which has been produced by differentiating the digital input signal x(k). A transmission device 4 transmits the pulse train xd(k) via a transmission channel 5 to a receiving device 6 which outputs the pulse train xd(k) on the output side.

The arrangement illustrated in FIG. 1 includes a receiving device 7 which is connected with its input 8 to an input 9 of the arrangement similar to the receiving device 6 with reference to the input 8. The dotted illustration is intended to include an analog-to-digital converter corresponding to the analog-to-digital converter 2, a signal encoder corresponding to the signal encoder 3, a transmitting device corresponding to the transmitting device 4, and a transmission channel corresponding to the transmission channel 5. A pulse train yd(k) obtained in accordance with the pulse train xd(k) of the signal y(t) is then produced at the output of the further receiving device 7.

In addition to the receiving device 7, it is also possible for additional receiving devices to have additional pulse trains applied to them in the same way.

Figure 5:
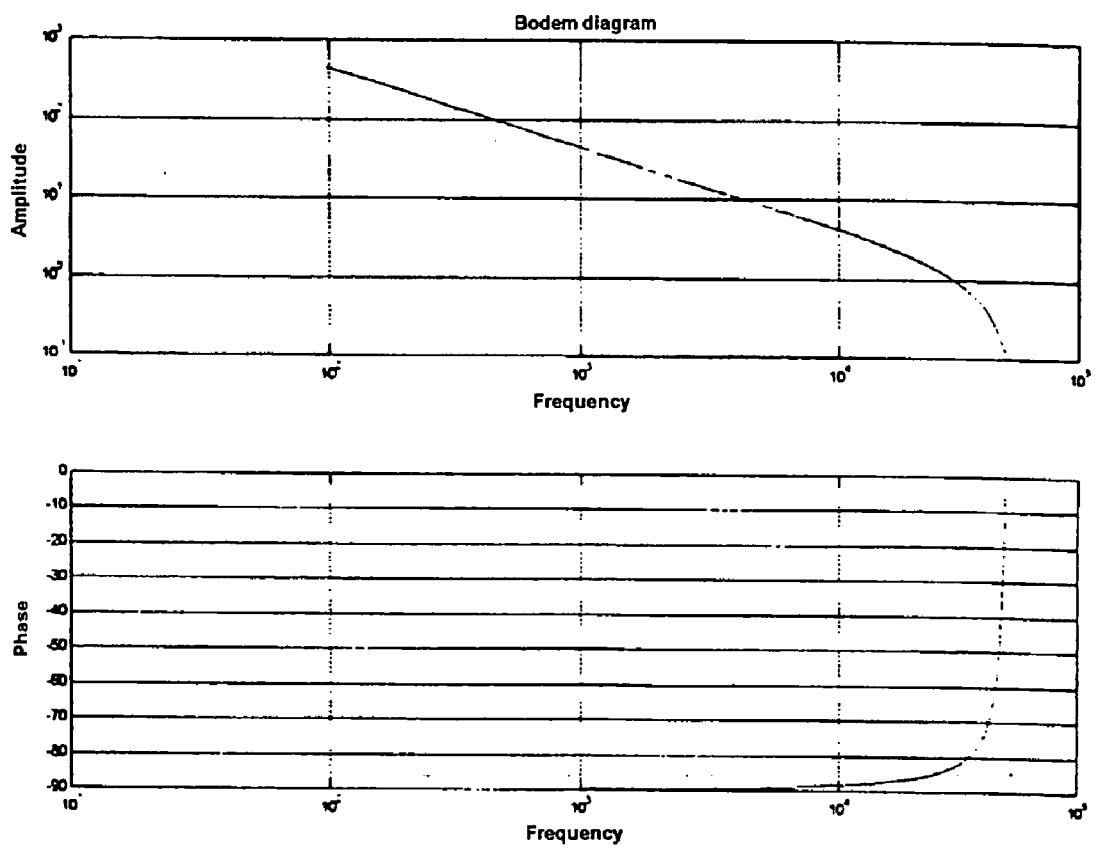
FIG. 5 shows the characteristic and structure of the filter according to FIG. 4.

On the output side, a signal decoder 10, which includes a resampling device 11 on the input side, is connected to the receiving devices 6 and 7. This resampling device 11 can be designed and operated as illustrated in detail in U.S. Pat. No. 5,075,880, particularly in FIG. 5, and described in conjunction therewith. Thus, in the resampling device 11, the digital input signals xd(k) and yd(k) are respectively sampled with the aid of a common post-processing clock of the resampling device, and digital auxiliary signals xd(nk+j) and yd(nk+j) are formed in the process by the insertion of zero values. In this case, the resampling device 11 is designed with regard to its post-processing clock such that the latter is at least twice as fast as the fastest operating clock during the formation of the digital input signals x(k). For example, if the sampling frequencies for obtaining the digital input signals x(k) are between approximately 1 and 40 kHz, a frequency range of between 10 and 500 kHz comes into consideration for the post-processing clock; approximately 200 kHz may be recommended.

The digital auxiliary signals xd(nk+j) and yd(nk+j) with the comparatively high post-processing clock are fed in each case to an interpolation filter 12 and 13, respectively, which is an integrator in each case in the exemplary embodiment illustrated. The integrators are used in each case because differentiators have been used as signal encoders 3. A transmission characteristic with the value 1 thereby results with regard to the mode of operation of the signal encoder 3 and of the integrator 12 of the signal decoder 10.

Other interpolation filters also basically come into consideration, for example Lagrange interpolators or Spline interpolators.

The pulse trains x(nk+j) and y(nk+j) formed at the output of the integrators 12 and 13 are synchronized and are respectively fed to an anti-aliasing filter 14 and 15, by means of which filters the pulse trains are limited to the bandwidth required for processing in an evaluation device (not illustrated). The result is the reduction of digital output signals x(m) at the output of one anti-aliasing filter 14, and y(m) at the output of the other anti-aliasing filter 15. These digital output signals x(m) and y(m) can now be reduced in a known way to a sampling rate which is suitable for an evaluation device (not illustrated). This sampling rate produced by means of an integral divisor from the sampling rate of the resampling device 11. For the assumed frequencies, reasonable values are between about 0.6 and 10 kHz for applications in the monitoring of electric power supply systems.

If x(t) and y(t) are pure sinusoidal or cosinusoidal signals, it is then possible to dispense with the signal encoder 3 in each case. This also holds in the case of signals which are not pure sinusoidal or cosinusoidal ones whenever x(t) and y(t) are output variables of Rogovsky transducers because these output variables correspond to the differential quotient of the transducer input variables.

Figure 2:
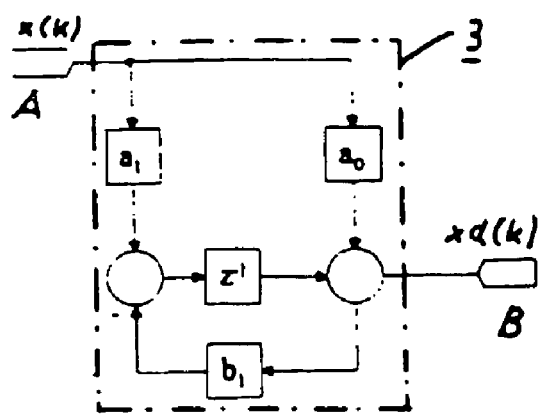
FIG. 2 shows an exemplary embodiment of a filter for filtering the digital input variables.
Figure 3:
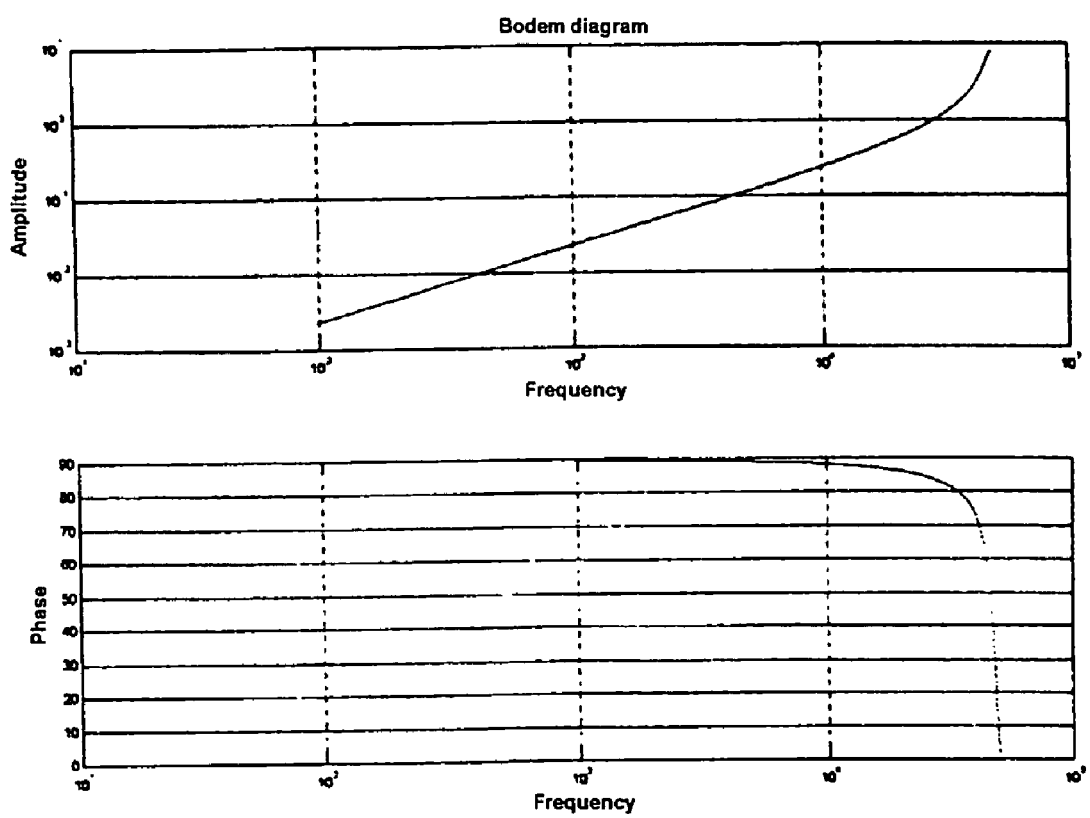
FIG. 3 shows the characteristic and structure of the filter according to FIG. 2.

FIG. 2 illustrates an exemplary embodiment for a signal encoder 3 in accordance with FIG. 1, which is designed as an FIR filter acting as a differentiator. In FIG. 3, A denotes the input of the signal encoder, and B denotes the output. The digital input signal x(k) is used to form the pulse train xd(k). The coefficients $a_0$, $a_1$, and $b_1$ of the signal coder 3 are dimensioned as follows:

| Coefficient | Value |
| --- | --- |
| a0 | 0.66666666666667 |
| a1 | −0.66666666666667 |
| b1 | 0.83333333333333 |

In FIG. 3(a), the amplitude characteristic is illustrated plotted against the frequency of the signal encoder according to FIG. 2, while in FIG. 3(b) the phase characteristic is reproduced plotted against the frequency of such a filter.

Figure 4:
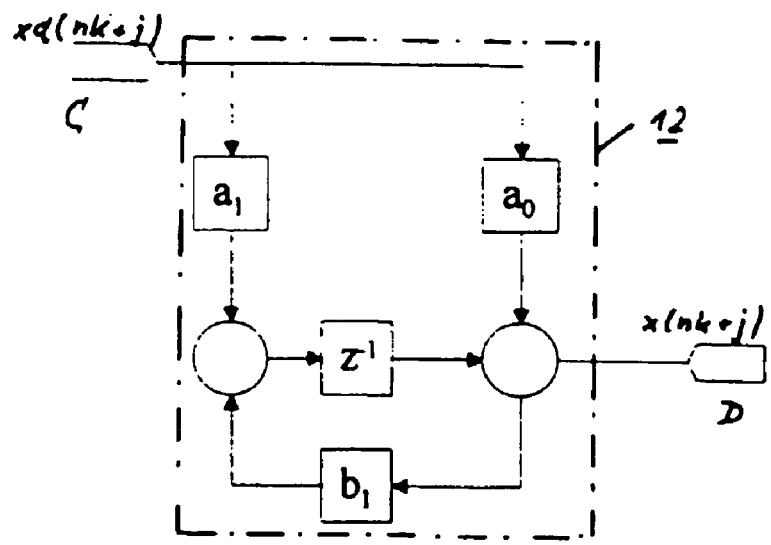
FIG. 4 illustrates an exemplary embodiment of an interpolation filter.

The interpolation device 12 illustrated in FIG. 4, or the interpolation device 13 in accordance with FIG. 1 shows an FIR filter as integrator having coefficients $a_0$, $a_1$, $b_1$ dimensioned in a way which may be gathered from the following table. C denotes the input of this FIR filter, and D denotes its output.

| Coefficient | Value |
| --- | --- |
| a0 | 1.50000000000000 |
| a1 | 1.25000000000000 |
| b1 | −1 |

In FIG. 5(a), the amplitude characteristic is shown plotted against the frequency of the filter according to FIG. 4, and FIG. 5(b) the phase characteristic is shown plotted against the frequency of such a filter. It may be seen that the frequency characteristics of the filters according to FIGS. 2 and 4 are inverse relative to one another, and this leads to the targeted transmission function having the value 1.

While the invention has been explained with respect to the embodiments described above, it will be apparent to those skilled in the art that various modifications and improvements may be made without departing from the spirit and scope of the invention. Accordingly, it is to be understood that the invention is not to be limited by the specific illustrated embodiments, but only by the scope of the appended claims.

What is claimed is:

1. A method for synchronizing a plurality of digital input signals formed by sampling analog input variables of measuring transducers, wherein the measuring transducers are disposed at various points in an electric power supply system; and wherein the analog input variables are sampled with a dedicated operating clock;

the method comprising:

encoding each digital input signal using a signal encoder formed by a differentiator forming encoded digital input signals;

transmitting each encoded digital input signal from a transmission device via a transmission channel to a receiving device;

forming digital auxiliary signals using a signal resampling device by respectively sampling the received digital input signals with a common post-processing clock, which is at least twice as fast as a fastest operating clock; and forming synchronized digital output signals corresponding to the digital input signals by interpolating each digital auxiliary signal using an interpolation filter formed by an integrator.

2. The method according to claim 1, further comprising: filtering the synchronized digital output signals with an anti-aliasing filter directly after the interpolation.

3. The method according to claim 1, further comprising: forming the digital auxiliary signals directly from the input signals and using an integrator for the interpolation when the digital input signals are formed from secondary variables of Rogovsky measuring transducers.

* * * * *